(12) United States Patent
Zhu et al.

(10) Patent No.: US 12,382,319 B2
(45) Date of Patent: Aug. 5, 2025

(54) TECHNIQUES FOR BEAM MANAGEMENT DURING A TUNE-AWAY

(71) Applicant: QUALCOMM Incorporated, San Diego, CA (US)

(72) Inventors: Jun Zhu, San Diego, CA (US); Jun Hu, San Diego, CA (US); Bhupesh Manoharlal Umatt, Poway, CA (US); Yong Li, San Diego, CA (US); Raghu Narayan Challa, San Diego, CA (US); Arnab Pal, Hyderabad (IN); Vishnu Namboodiri Karakkad Kesavan Namboodiri, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 842 days.

(21) Appl. No.: 17/447,768

(22) Filed: Sep. 15, 2021

(65) Prior Publication Data

US 2023/0087071 A1   Mar. 23, 2023

(51) Int. Cl.
*H04W 24/08* (2009.01)
*H04W 72/0453* (2023.01)
*H04W 76/28* (2018.01)

(52) U.S. Cl.
CPC ....... *H04W 72/0453* (2013.01); *H04W 24/08* (2013.01); *H04W 76/28* (2018.02)

(58) Field of Classification Search
CPC .......................... H04W 72/0453; H04W 76/28
See application file for complete search history.

(56) References Cited

U.S. PATENT DOCUMENTS

| | | | |
|---|---|---|---|
| 2015/0289314 A1* | 10/2015 | Yang | H04W 56/0045 455/552.1 |
| 2019/0190582 A1* | 6/2019 | Guo | H04L 27/2607 |
| 2020/0382357 A1 | 12/2020 | Hu et al. | |
| 2021/0235344 A1* | 7/2021 | Jung | H04W 36/32 |
| 2021/0250077 A1* | 8/2021 | Karakkad Kesavan Namboodiri | H04W 24/10 |
| 2021/0344402 A1* | 11/2021 | Dalsgaard | H04W 24/00 |
| 2021/0409096 A1* | 12/2021 | Liou | H04W 24/10 |
| 2022/0240078 A1* | 7/2022 | Park | H04W 24/08 |
| 2022/0394697 A1* | 12/2022 | Kim | H04B 7/088 |

(Continued)

FOREIGN PATENT DOCUMENTS

WO   WO-2019242862 A1 * 12/2019 ........... H04L 5/0048

OTHER PUBLICATIONS

International Search Report and Written Opinion—PCT/US2022/075204—ISA/EPO—Nov. 18, 2022.

*Primary Examiner* — Lan-Huong Truong
(74) *Attorney, Agent, or Firm* — Dalei Dong; Harrity & Harrity, LLP

(57) ABSTRACT

Various aspects of the present disclosure generally relate to wireless communication. In some aspects, a user equipment (UE) may configure one or more radio frequency (RF) chains of the UE to communicate using a second radio access technology (RAT) for a length of time. The UE may identify that the length of time satisfies a threshold. The UE may configure the one or more RF chains to the first RAT. The UE may initiate a beam measurement on the first RAT in a number of consecutive measurement occasions based at least in part on the length of time satisfying the threshold. Numerous other aspects are described.

30 Claims, 10 Drawing Sheets

(56) References Cited

U.S. PATENT DOCUMENTS

2023/0067908 A1* 3/2023 Zhu ................... H04B 7/0695
2023/0180089 A1* 6/2023 Panwar ............ H04W 36/0085
　　　　　　　　　　　　　　　　　　370/331

* cited by examiner

TECHNIQUES FOR BEAM MANAGEMENT DURING A TUNE-AWAY

FIELD OF THE DISCLOSURE

Aspects of the present disclosure generally relate to wireless communication and to techniques and apparatuses for beam management during a tune-away.

DESCRIPTION OF RELATED ART

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a user equipment (UE). The method may include configuring one or more radio frequency (RF) chains of the UE to communicate using a second radio access technology (RAT) for a length of time. The method may include identifying that the length of time satisfies a threshold. The method may include configuring the one or more RF chains to the first RAT. The method may include initiating a beam measurement on the first RAT in a number of consecutive measurement occasions based at least in part on the length of time satisfying the threshold.

Some aspects described herein relate to a UE for wireless communication. The user equipment may include a memory and one or more processors coupled to the memory. The one or more processors may be configured to configure one or more RF chains of the UE to communicate using a second RAT for a length of time. The one or more processors may be configured to identify that the length of time satisfies a threshold. The one or more processors may be configured to configure the one or more RF chains to the first RAT. The one or more processors may be configured to initiate a beam measurement on the first RAT in a number of consecutive measurement occasions based at least in part on the length of time satisfying the threshold.

Some aspects described herein relate to a non-transitory computer-readable medium that stores a set of instructions for wireless communication by a UE. The set of instructions, when executed by one or more processors of the UE, may cause the UE to configure one or more RF chains of the UE to communicate using a second RAT for a length of time. The set of instructions, when executed by one or more processors of the UE, may cause the UE to identify that the length of time satisfies a threshold. The set of instructions, when executed by one or more processors of the UE, may cause the UE to configure the one or more RF chains to the first RAT. The set of instructions, when executed by one or more processors of the UE, may cause the UE to initiate a beam measurement on the first RAT in a number of consecutive measurement occasions based at least in part on the length of time satisfying the threshold.

Some aspects described herein relate to an apparatus for wireless communication. The apparatus may include means for configuring one or more RF chains of the apparatus to communicate using a second RAT for a length of time. The apparatus may include means for identifying that the length of time satisfies a threshold. The apparatus may include means for configuring the one or more RF chains to the first RAT. The apparatus may include means for initiating a beam measurement on the first RAT in a number of consecutive measurement occasions based at least in part on the length of time satisfying the threshold.

Aspects generally include a method, apparatus, system, computer program product, non-transitory computer-readable medium, user equipment, base station, wireless communication device, and/or processing system as substantially described herein with reference to and as illustrated by the drawings.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
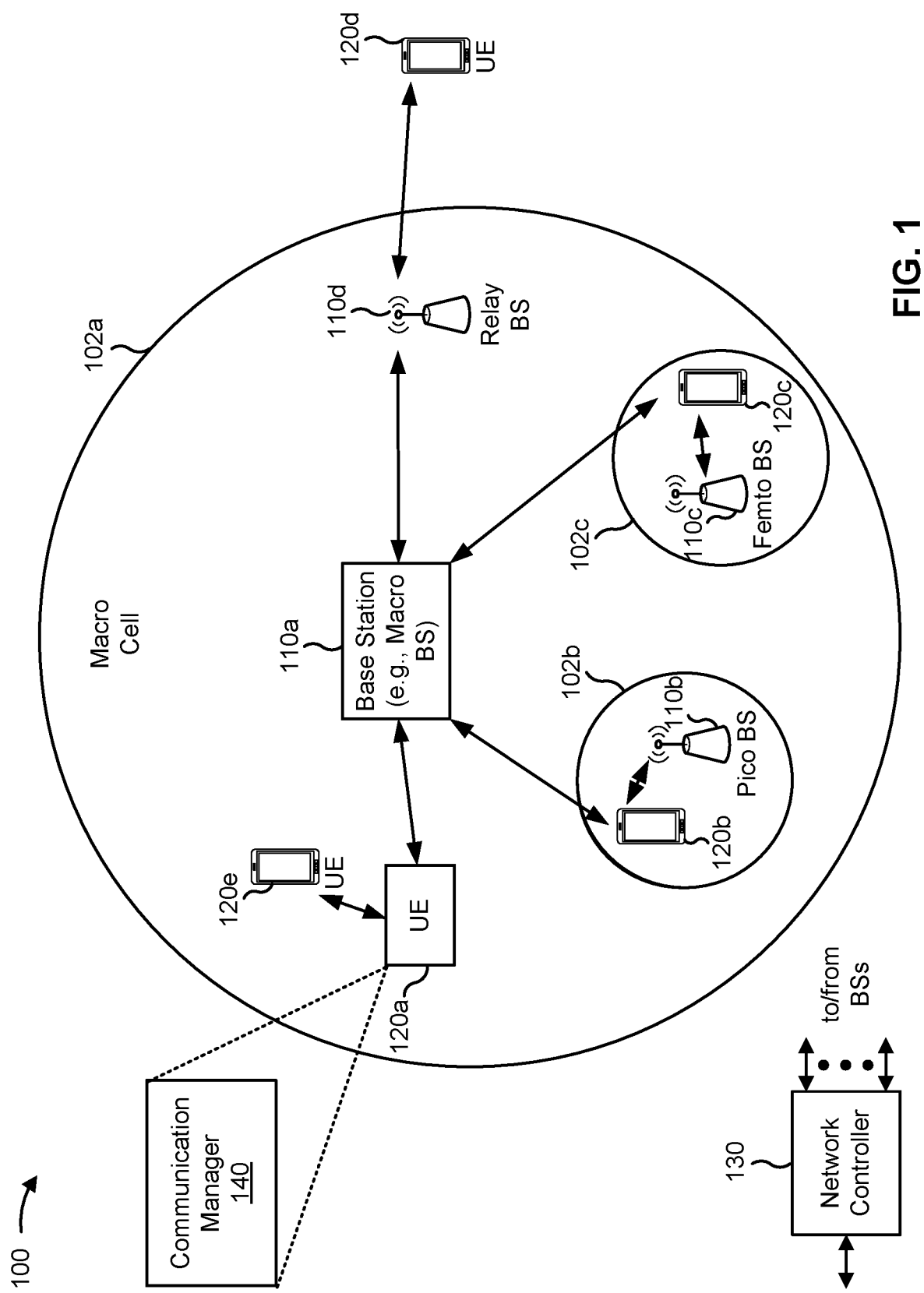
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless or wired medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHZ-52.6 GHZ). It should be understood that although a portion of FR1 is greater than 6 GHZ, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHZ). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHZ), and FR5 (114.25 GHZ-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHZ, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may configure one or more radio frequency (RF) chains of the UE to communicate using a second RAT for a length of time; identify that the length of time satisfies a threshold; configure the one or more RF chains to the first RAT; and initiate a beam measurement on the first RAT in a number of consecutive measurement occasions based at least in part on the length of time satisfying the threshold. Additionally, or alternatively, the communication manager 140 may perform one or more other operations described herein.

As indicated above, FIG. 1 is provided as an example. Other examples may differ from what is described with regard to FIG. 1.

Figure 2:
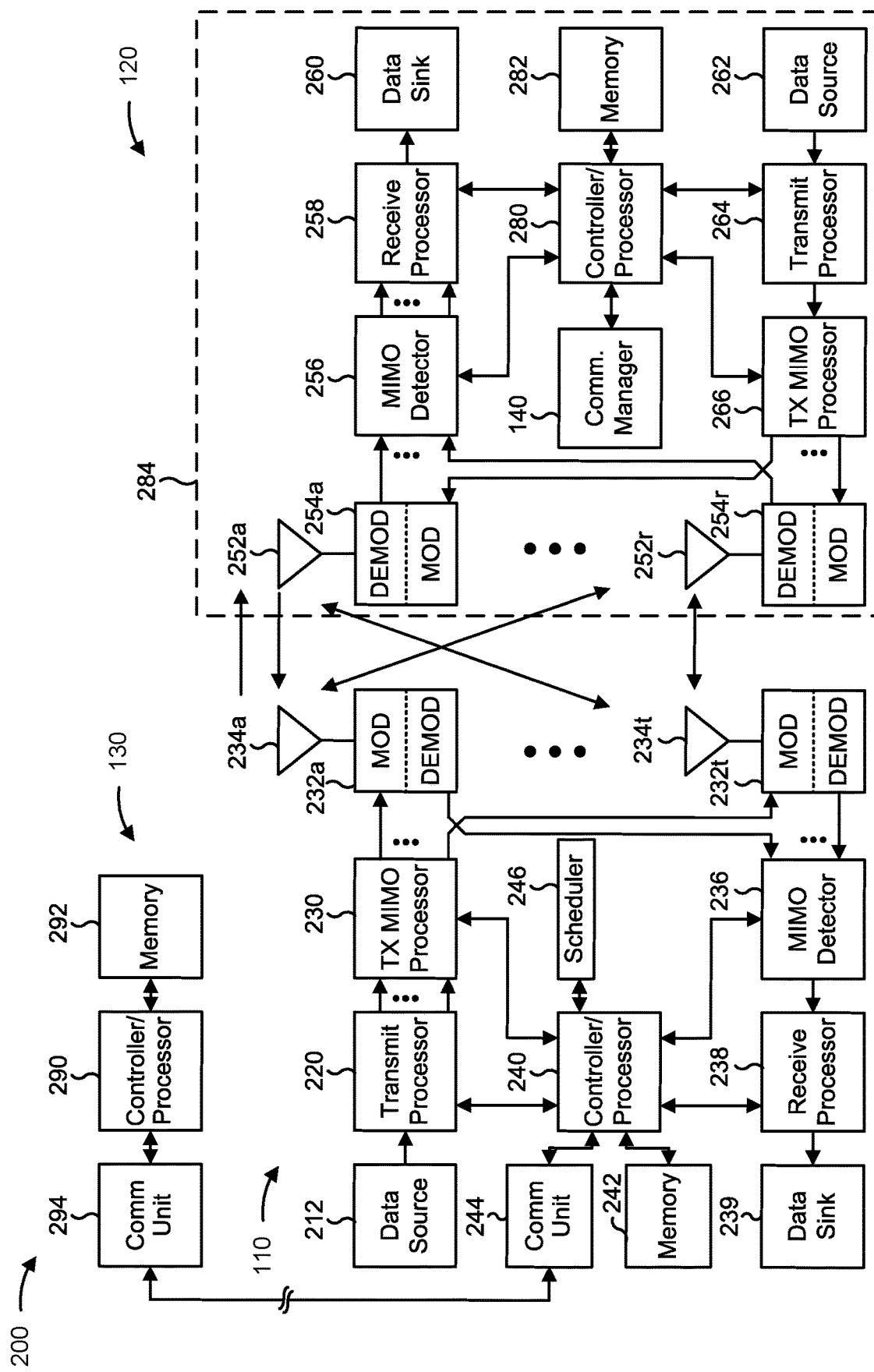
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (Tx) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 3-10).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 3-10).

The controller/processor 240 of the base station 110, the controller/processor 280 of the UE 120, and/or any other component(s) of FIG. 2 may perform one or more techniques associated with beam management in a tune-away, as described in more detail elsewhere herein. For example, the controller/processor 240 of the base station 110, the controller/processor 280 of the UE 120, and/or any other component(s) of FIG. 2 may perform or direct operations of, for example, process 900 of FIG. 9 and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 900 of FIG. 9 and/or other processes as described herein. In some examples, executing instructions may include running the instructions, converting the instructions, compiling the instructions, and/or interpreting the instructions, among other examples.

In some aspects, the UE 120 includes means for configuring one or more RF chains of the UE to communicate using a second RAT for a length of time; means for identifying that the length of time satisfies a threshold; means for configuring the one or more RF chains to the first RAT; and/or means for initiating a beam measurement on the first RAT in a number of consecutive measurement occasions based at least in part on the length of time satisfying the threshold. The means for the UE 120 to perform operations described herein may include, for example, one or more of communication manager 140, antenna 252, modem 254, MIMO detector 256, receive processor 258, transmit processor 264, TX MIMO processor 266, controller/processor 280, or memory 282.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
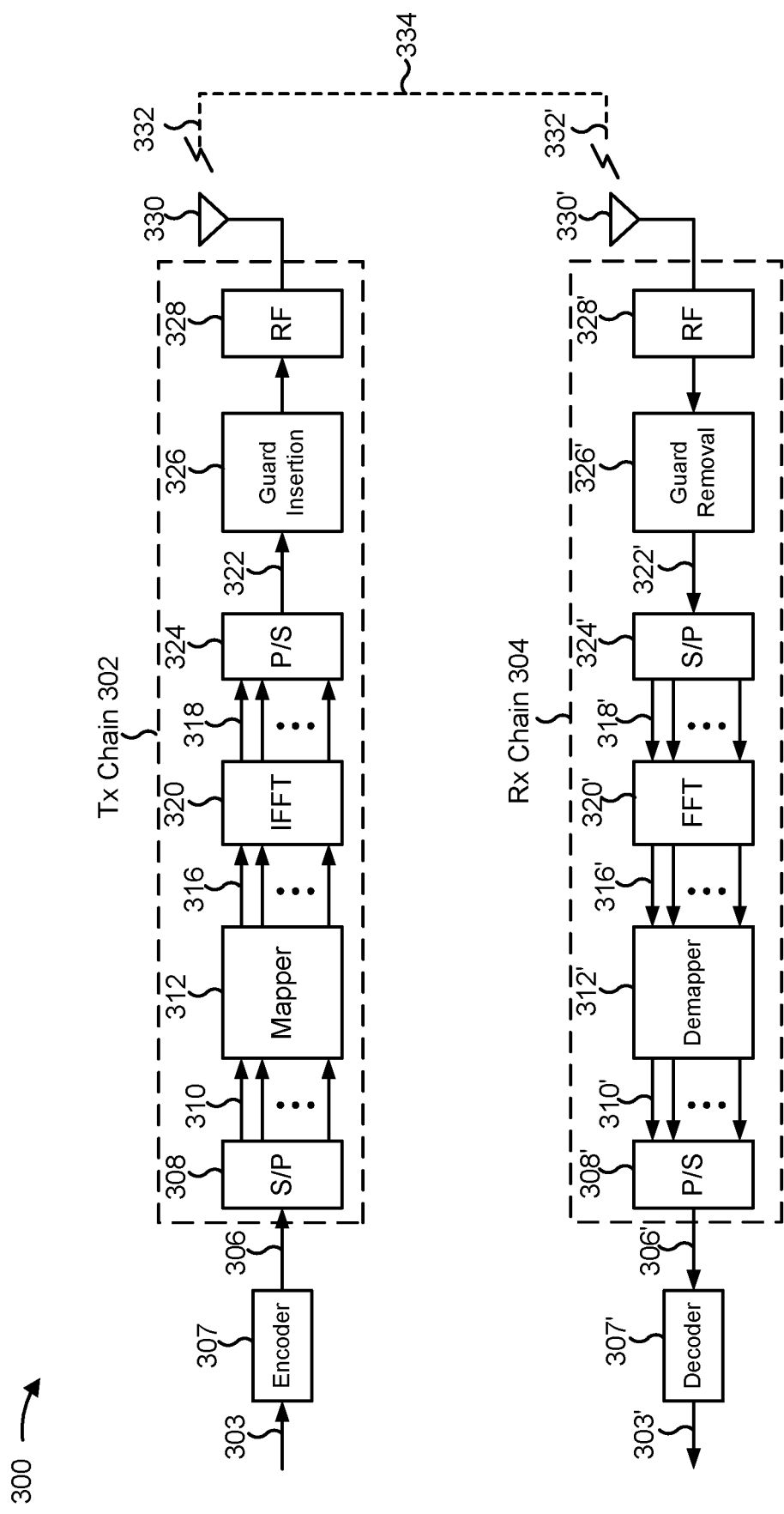
FIG. 3 is a diagram illustrating an example of a transmit (Tx) chain 302 and a receive (Rx) chain of a UE, in accordance with the present disclosure.

FIG. 3 is a diagram illustrating an example 300 of a Tx chain 302 and a receive (Rx) chain 304 of a UE 120, in accordance with the present disclosure. In some aspects, one or more components of Tx chain 302 may be implemented in transmit processor 264, TX MIMO processor 266, modem 254, and/or controller/processor 280, as described above in connection with FIG. 2. In some aspects, Tx chain 302 may be implemented in UE 120 for transmitting data 306 (e.g., uplink data, an uplink reference signal, and/or uplink control information) to base station 110 on an uplink channel. As used herein, "radio frequency (RF) chain" may refer to a Tx chain 302 and/or an Rx chain 304. A UE may include a plurality of Tx chains 302 and/or a plurality of Rx chains 304. An Rx chain 304 may be used to perform beam management of a receive beam of the UE, as described in more detail elsewhere herein.

An encoder 307 may alter a signal (e.g., a bitstream) 303 into data 306. Data 306 to be transmitted is provided from encoder 307 as input to a serial-to-parallel (S/P) converter 308. In some aspects, S/P converter 308 may split the transmission data into N parallel data streams 310.

The N parallel data streams 310 may then be provided as input to a mapper 312. Mapper 312 may map the N parallel data streams 310 onto N constellation points. The mapping may be done using a modulation constellation, such as binary phase-shift keying (BPSK), quadrature phase-shift keying (QPSK), 8 phase-shift keying (8PSK), quadrature amplitude modulation (QAM), etc. Thus, mapper 312 may output N parallel symbol streams 316, each symbol stream 316 corresponding to one of N orthogonal subcarriers of an inverse fast Fourier transform (IFFT) component 320. These N parallel symbol streams 316 are represented in the frequency domain and may be converted into N parallel time domain sample streams 318 by IFFT component 320.

In some aspects, N parallel modulations in the frequency domain correspond to N modulation symbols in the frequency domain, which are equal to N mapping and N-point IFFT in the frequency domain, which are equal to one (useful) OFDM symbol in the time domain, which are equal to N samples in the time domain. One OFDM symbol in the time domain, Ns, is equal to Nep (the number of guard samples per OFDM symbol)+N (the number of useful samples per OFDM symbol).

The N parallel time domain sample streams 318 may be converted into an OFDM/OFDMA symbol stream 322 by a parallel-to-serial (P/S) converter 324. A guard insertion component 326 may insert a guard interval between successive OFDM/OFDMA symbols in the OFDM/OFDMA symbol stream 322. The output of guard insertion component 326 may then be upconverted to a desired transmit frequency band by an RF front end 328. An antenna 330 may then transmit the resulting signal 332.

In some aspects, Rx chain 304 may utilize OFDM/OFDMA. In some aspects, one or more components of Rx chain 304 may be implemented in receive processor 258, MIMO detector 256, modem 254, and/or controller/processor 280, as described above in connection with FIG. 2. In some aspects, Rx chain 304 may be implemented in UE 120 for receiving data 306 (e.g., downlink data, a downlink reference signal, and/or downlink control information) from base station 110 on a downlink channel.

A transmitted signal 332 is shown traveling over a wireless channel 334 from Tx chain 302 to Rx chain 304. When a signal 332' is received by an antenna 330', the received signal 332' may be downconverted to a baseband signal by an RF front end 328'. A guard removal component 326' may then remove the guard interval that was inserted between OFDM/OFDMA symbols by guard insertion component 326.

The output of guard removal component 326' may be provided to an S/P converter 324'. The output may include an OFDM/OFDMA symbol stream 322', and S/P converter 324' may divide the OFDM/OFDMA symbol stream 322' into N parallel time-domain symbol streams 318', each of which corresponds to one of the N orthogonal subcarriers. A fast Fourier transform (FFT) component 320' may convert the N parallel time-domain symbol streams 318' into the frequency domain and output N parallel frequency-domain symbol streams 316'.

A demapper 312' may perform the inverse of the symbol mapping operation that was performed by mapper 312, thereby outputting N parallel data streams 310'. A P/S converter 308' may combine the N parallel data streams 310' into a single data stream 306'. Ideally, data stream 306' corresponds to data 306 that was provided as input to Tx chain 302. Data stream 306' may be decoded into a decoded data stream 303' by decoder 307'.

The number and arrangement of components shown in FIG. 3 are provided as an example. In practice, there may be additional components, fewer components, different components, or differently arranged components than those shown in FIG. 3. Furthermore, two or more components shown in FIG. 3 may be implemented within a single component, or a single component shown in FIG. 3 may be implemented as multiple, distributed components. Additionally, or alternatively, a set of components (e.g., one or more components) shown in FIG. 3 may perform one or more functions described as being performed by another set of components shown in FIG. 3.

Figure 4:
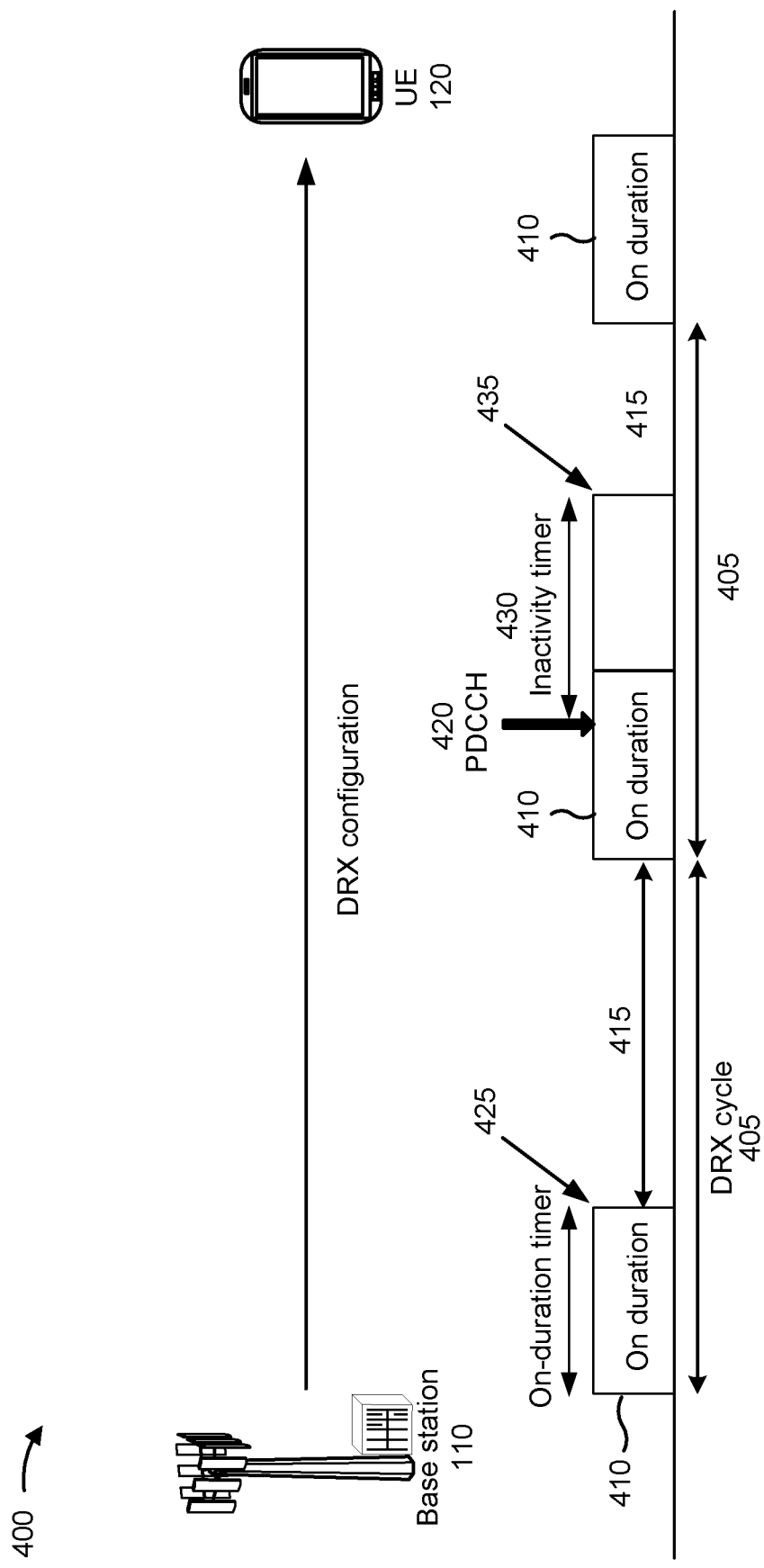
FIG. 4 is a diagram illustrating an example of a discontinuous reception (DRX) configuration, in accordance with the present disclosure.

FIG. 4 is a diagram illustrating an example 400 of a discontinuous reception (DRX) configuration, in accordance with the present disclosure. Example 400 is an example of a connected-mode DRX configuration.

As shown in FIG. 4, a base station 110 may transmit a DRX configuration to a UE 120 to configure a DRX cycle 405 for the UE 120. A DRX cycle 405 may include a DRX on duration 410 (e.g., during which a UE 120 is awake or in an active state) and an opportunity to enter a DRX sleep state 415. As used herein, the time during which the UE 120 is configured to be in an active state during the DRX on duration 410 may be referred to as an active time, and the time during which the UE 120 is configured to be in the DRX sleep state 415 may be referred to as an inactive time. As described below, the UE 120 may monitor a physical downlink control channel (PDCCH) during the active time, and the UE 120 may refrain from monitoring the PDCCH during the inactive time.

During the DRX on duration 410 (e.g., the active time), the UE 120 may monitor a downlink control channel (e.g., a PDCCH), as shown by reference number 420. For example, the UE 120 may monitor the PDCCH for downlink control information (DCI) pertaining to the UE 120. If the UE 120 does not detect and/or successfully decode any PDCCH communications intended for the UE 120 during the DRX on duration 410, then the UE 120 may enter the sleep state 415 (e.g., for the inactive time) at the end of the DRX on duration 410, as shown by reference number 425. In this way, the UE 120 may conserve battery power and reduce power consumption. As shown, the DRX cycle 405 may repeat with a configured periodicity according to the DRX configuration.

If the UE 120 detects and/or successfully decodes a PDCCH communication intended for the UE 120, then the UE 120 may remain in an active state (e.g., awake) for the duration of a DRX inactivity timer 430 (e.g., which may extend the active time). The UE 120 may start the DRX inactivity timer 430 at a time at which the PDCCH communication is received (e.g., in a transmission time interval (TTI) in which the PDCCH communication is received, such as a slot or a subframe). The UE 120 may remain in the active state until the DRX inactivity timer 430 expires, at which time the UE 120 may enter the sleep state 415 (e.g., for the inactive time), as shown by reference number 435. During the duration of the DRX inactivity timer 430, the UE 120 may continue to monitor for PDCCH communications, may obtain a downlink data communication (e.g., on a downlink data channel, such as a physical downlink shared channel (PDSCH)) scheduled by the PDCCH communication, and/or may prepare and/or transmit an uplink communication (e.g., on a physical uplink shared channel (PUSCH)) scheduled by the PDCCH communication. The UE 120 may restart the DRX inactivity timer 430 after each detection of a PDCCH communication for the UE 120 for an initial transmission (e.g., but not for a retransmission). By operating in this manner, the UE 120 may conserve battery power and reduce power consumption by entering the sleep state 415.

As indicated above, FIG. 4 is provided as an example. Other examples may differ from what is described with respect to FIG. 4.

Figure 5:
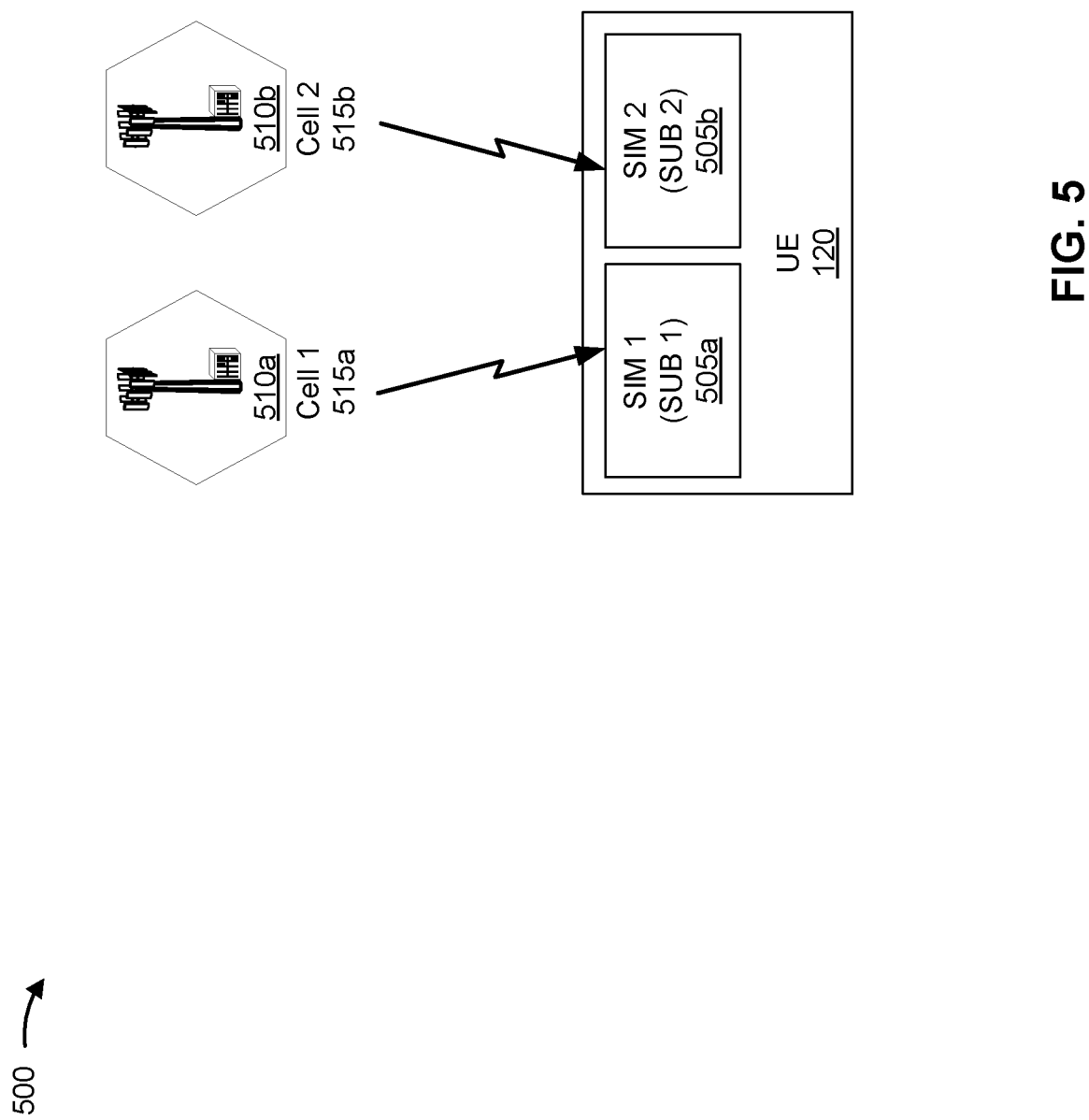
FIG. 5 is a diagram illustrating an example of a multi-subscriber identity module (SIM) UE, in accordance with the present disclosure.

FIG. 5 is a diagram illustrating an example 500 of a multi-subscriber identity module (SIM) UE, in accordance with the present disclosure. As shown in FIG. 5, a UE 120 may be a multiple SIM (multi-SIM) UE that includes multiple SIMs (two or more SIMs), shown as a first SIM 505a and a second SIM 505b. The first SIM 505a may be associated with a first subscription (shown as SUB 1), and the second SIM 505b may be associated with a second subscription (shown as SUB 2). A subscription may be a subscription with a network operator (for example, a mobile network operator (MNO)) that enables the UE 120 to access a wireless network (for example, a radio access network (RAN)) associated with the network operator.

A SIM 505 may be a removable SIM (for example, a SIM card) or an embedded SIM. A SIM 505 may include an integrated circuit that securely stores an international mobile subscriber identity (IMSI) and a security key, which are used to identify and authenticate a corresponding subscription associated with the SIM 505. In some cases, a SIM 505 may store a list of services that the UE 120 has permission to access using a subscription associated with the SIM 505, such as a data service or a voice service, among other examples.

As further shown in FIG. 5, the UE 120 may communicate (for example, in a connected mode, an idle mode, or an inactive mode) with a first base station 510a via a first cell 515a (shown as Cell 1) using the first SIM 505a. In this case, a first subscription (SUB 1) of the UE 120 may be used to access the first cell 515a (for example, using a first IMSI for UE identification, using a first security key for UE authentication, using a first list of services that the UE 120 is permitted to access using the first subscription, or by counting data or voice usage on the first cell against the first subscription, among other examples). Similarly, the UE 120 may communicate (for example, in a connected mode, an idle mode, or an inactive mode) with a second base station 510*b* via a second cell 515*b* (shown as Cell 2) using the second SIM 505*b*. In this case, a second subscription (SUB 2) of the UE 120 may be used to access the second cell 515*b* (for example, using a second IMSI for UE identification, using a second security key for UE authentication, using a second list of services that the UE 120 is permitted to access using the second subscription, or by counting data or voice usage on the second cell against the second subscription, among other examples).

The first base station 510*a* and/or the second base station 510*b* may include one or more of the base stations 110 described above in connection with FIG. 1. Although the first cell 515*a* and the second cell 515*b* are shown as being provided by different base stations, in some aspects, the first cell 515 and the second cell 515*b* may be provided by the same base station. Thus, in some aspects, the first base station 510*a* and the second base station 510*b* may be integrated into a single base station.

In some cases, the UE 120 may be capable of operating in a multi-SIM multiple standby (MSMS) mode, such as a dual SIM dual standby (DSDS) mode (e.g., when the UE 120 is associated with two subscriptions). Additionally, or alternatively, the UE 120 may be capable of operating in a multi-SIM multiple active (SR-MSMA) mode, such as a dual SIM dual active (DSDA) mode (e.g., when the UE 120 is associated with two subscriptions).

In a DSDA mode, the UE 120 is capable of concurrent active communication using both SIMs of the UE 120. Thus, a UE 120 in the DSDA mode is capable of communicating using the first SIM 305*a* (and the first subscription) at the same time as communicating using the second SIM 305*b* (and the second subscription). For example, when the UE 120 is in an active session (e.g., a voice call or another latency sensitive service, such as online gaming, stock trading, or an over-the-top (OTT) service) using the first SIM 305*a*, the UE 120 is capable of receiving a notification of a voice call using the second SIM 305*b* without interrupting communications that use the first SIM 305*a*, and without tuning or switching away from the first cell 315*a* to tune to the second cell 315*b*.

In a DSDS mode, the UE 120 is not capable of concurrent active communication using both SIMs of the UE 120. Thus, a UE 120 in the DSDS mode is not capable of communicating using the first SIM 305*a* (and the first subscription) at the same time as communicating using the second SIM 305*b* (and the second subscription). However, a UE 120 in the DSDS mode may be capable of switching between two separate mobile network services, may include hardware for maintaining multiple connections (for example, one connection per SIM) in a standby state, or may include hardware (for example, multiple transceivers) for maintaining multiple network connections at the same time, among other examples. However, a UE 120 in the DSDS mode may be capable of receiving data on only one connection at a time because radio frequency resources are shared between the multiple subscriptions. For example, a UE 120 in the DSDS mode may be associated with multiple subscriptions but may include only a single transceiver shared by the multiple subscriptions, a single transmit chain shared by the multiple subscriptions, or a single receive chain shared by the multiple subscriptions, among other examples.

In some examples, a UE 120 may be capable of operating in a DSDA mode for a first combination of RATs, and the UE 120 may not be capable of operating in a DSDA mode for a second combination of RATs. For example, the UE 120 may be capable of operating in a DSDA mode for NR+NR, where the first cell 315*a* (as well as the first SIM 305*a* and the first subscription) uses an NR RAT and the second cell 315*b* (as well as the second SIM 305*b* and the second subscription) also uses the NR RAT. However, the UE 120 may not be capable of operating in a DSDA mode for NR+LTE, where one of the first cell 315*a* (as well as the first SIM 305*a* and the first subscription) uses an NR RAT and the second cell 315*b* (as well as the second SIM 305*b* and the second subscription) uses an LTE RAT (or vice versa). In some aspects, the UE 120 may not be capable of operating in the DSDA mode for the second combination of RATs (e.g., NR+LTE), but be capable of operating in a DSDS mode for the second combination of RATs. This UE design reduces design costs as compared to enabling the UE 120 to operate using the DSDA mode for the second combination of RATs.

As indicated above, FIG. 5 is provided as an example. Other examples may differ from what is described with regard to FIG. 5.

Figure 6:
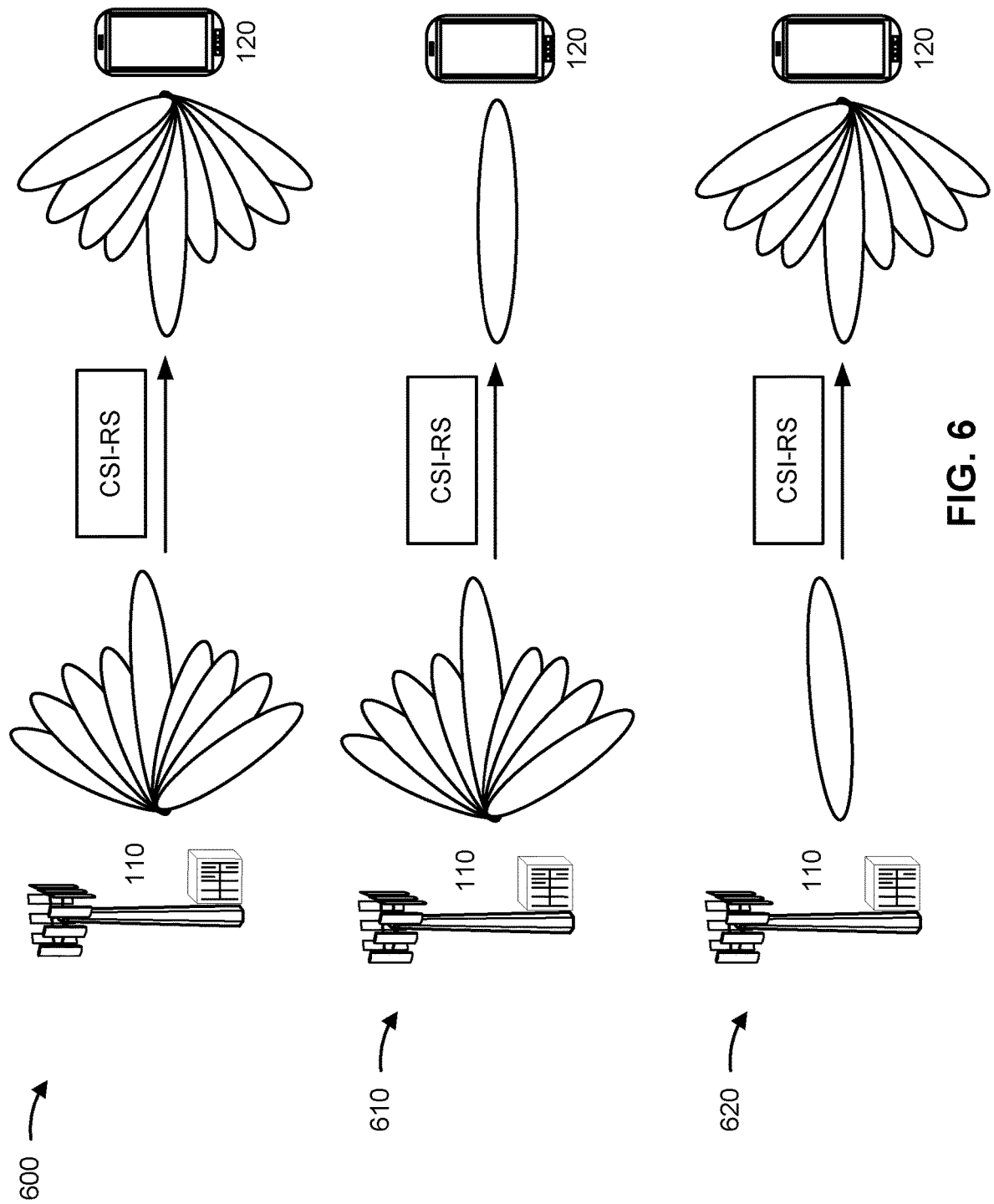
FIG. 6 is a diagram illustrating examples of channel state information reference signal (CSI-RS) beam management procedures, in accordance with the present disclosure.

FIG. 6 is a diagram illustrating examples 600, 610, and 620 of CSI-RS beam management procedures, in accordance with the present disclosure. As shown in FIG. 6, examples 600, 610, and 620 include a UE 120 in communication with a base station 110 in a wireless network (e.g., wireless network 100). However, the devices shown in FIG. 6 are provided as examples, and the wireless network may support communication and beam management between other devices (e.g., between a UE 120 and a base station 110 or TRP, between a mobile termination node and a control node, between an integrated access and backhaul (IAB) child node and an IAB parent node, and/or between a scheduled node and a scheduling node). In some aspects, the UE 120 and the base station 110 may be in a connected state (e.g., a radio resource control (RRC) connected state).

As shown in FIG. 6, example 600 may include a base station 110 and a UE 120 communicating to perform beam management using CSI-RSs. Example 600 depicts a first beam management procedure (e.g., P1 CSI-RS beam management). The first beam management procedure may be referred to as a beam selection procedure, an initial beam acquisition procedure, a beam sweeping procedure, a cell search procedure, and/or a beam search procedure. As shown in FIG. 6 and example 600, CSI-RSs may be configured to be transmitted from the base station 110 to the UE 120. The CSI-RSs may be configured to be periodic (e.g., using RRC signaling), semi-persistent (e.g., using media access control (MAC) control element (MAC-CE) signaling), and/or aperiodic (e.g., using DCI).

The first beam management procedure may include the base station 110 performing beam sweeping over multiple Tx beams. The base station 110 may transmit a CSI-RS using each transmit beam for beam management. To enable the UE 120 to perform Rx beam sweeping, the base station may use a transmit beam to transmit (e.g., with repetitions) each CSI-RS at multiple times within the same reference signal (RS) resource set so that the UE 120 can sweep through receive beams in multiple transmission instances. For example, if the base station 110 has a set of N transmit beams and the UE 120 has a set of M receive beams, the CSI-RS may be transmitted on each of the N transmit beams M times so that the UE 120 may receive M instances of the CSI-RS per transmit beam. In other words, for each transmit beam of the base station 110, the UE 120 may perform beam sweeping through the receive beams of the UE 120. As a result, the first beam management procedure may enable the UE 120 to measure a CSI-RS on different transmit beams using different receive beams to support selection of base station 110 transmit beams/UE 120 receive beam(s) beam pair(s). The UE 120 may report the measurements to the base station 110 to enable the base station 110 to select one or more beam pair(s) for communication between the base station 110 and the UE 120. While example 600 has been described in connection with CSI-RSs, the first beam management process may also use synchronization signal blocks (SSBs) for beam management in a similar manner as described above.

As shown in FIG. 6, example 610 may include a base station 110 and a UE 120 communicating to perform beam management using CSI-RSs. Example 610 depicts a second beam management procedure (e.g., P2 CSI-RS beam management). The second beam management procedure may be referred to as a beam refinement procedure, a base station beam refinement procedure, a TRP beam refinement procedure, and/or a transmit beam refinement procedure. As shown in FIG. 6 and example 610, CSI-RSs may be configured to be transmitted from the base station 110 to the UE 120. The CSI-RSs may be configured to be aperiodic (e.g., using DCI). The second beam management procedure may include the base station 110 performing beam sweeping over one or more transmit beams. The one or more transmit beams may be a subset of all transmit beams associated with the base station 110 (e.g., determined based at least in part on measurements reported by the UE 120 in connection with the first beam management procedure). The base station 110 may transmit a CSI-RS using each transmit beam of the one or more transmit beams for beam management. The UE 120 may measure each CSI-RS using a single (e.g., a same) receive beam (e.g., determined based at least in part on measurements performed in connection with the first beam management procedure). The second beam management procedure may enable the base station 110 to select a best transmit beam based at least in part on measurements of the CSI-RSs (e.g., measured by the UE 120 using the single receive beam) reported by the UE 120.

As shown in FIG. 6, example 620 depicts a third beam management procedure (e.g., P3 CSI-RS beam management). The third beam management procedure may be referred to as a beam refinement procedure, a UE beam refinement procedure, and/or a receive beam refinement procedure. As shown in FIG. 6 and example 620, one or more CSI-RSs may be configured to be transmitted from the base station 110 to the UE 120. The CSI-RSs may be configured to be aperiodic (e.g., using DCI). The third beam management process may include the base station 110 transmitting the one or more CSI-RSs using a single transmit beam (e.g., determined based at least in part on measurements reported by the UE 120 in connection with the first beam management procedure and/or the second beam management procedure). To enable the UE 120 to perform receive beam sweeping, the base station may use a transmit beam to transmit (e.g., with repetitions) CSI-RS at multiple times within the same RS resource set so that UE 120 can sweep through one or more receive beams in multiple transmission instances. The one or more receive beams may be a subset of all receive beams associated with the UE 120 (e.g., determined based at least in part on measurements performed in connection with the first beam management procedure and/or the second beam management procedure). The third beam management procedure may enable the base station 110 and/or the UE 120 to select a best receive beam based at least in part on reported measurements received from the UE 120 (e.g., of the CSI-RS of the transmit beam using the one or more receive beams).

As indicated above, FIG. 6 is provided as an example of beam management procedures. Other examples of beam management procedures may differ from what is described with respect to FIG. 6. For example, the UE 120 and the base station 110 may perform the third beam management procedure before performing the second beam management procedure, and/or the UE 120 and the base station 110 may perform a similar beam management procedure to select a UE transmit beam.

A UE may include a number of RF chains, such as one or more Tx chains and one or more Rx chains, as described above. In some cases, a UE may support communication via a combination of multiple RATs. For example, a first subscriber of the UE may be associated with a first RAT and a second subscriber of the UE may be associated with a second RAT. In some aspects, a group of RF chains may be configured to communicate using a first RAT. Subsequently, the group of RF chains may be temporarily configured (e.g., tuned) to communicate using a second RAT before returning to communication using the first RAT. Temporarily communicating on a second RAT before returning to a first RAT is referred to herein as a tune-away.

A UE may track a receive beam by performing beamsweeping across multiple candidate receive beams. Each receive beam may use two Rx ports (corresponding to two Rx chains) corresponding to a horizontal polarization and a vertical polarization. Generally, beamsweeping is performed on an anchor carrier, which may be a primary component carrier (PCC) on a PCC band. An anchor carrier is a carrier used for beam management, loop tracking, or the like.

During a tune-away, a UE may lose the ability to track a receive beam. For example, the tune-away may be to a RAT or a frequency range that does not support beamforming. As another example, the tune-away may impact an Rx chain with which the UE is performing tracking. This may be particularly problematic for a longer tune-away, in which it may be expected that the UE's beam is more outdated than after a shorter tune-away. In this case, the UE may have to fall back to using a sub-optimal beam (such as a pseudo omni-directional (PO) beam, an unrefined beam, or a beam at a lower refinement level) until beam refinement can be performed, which decreases throughput.

Furthermore, the UE may perform beam refinement based at least in part on measurement occasions. For example, the UE may perform a beam measurement in a measurement occasion to identify or refine a beam. If the UE returns from a tune-away and detects that a measurement in a next measurement occasion (which may use a sub-optimal beam such as a PO beam) satisfies a threshold, the UE may enter a relaxed mode (referred to as a cell excellent mode) in which a measurement timeline of the UE is relaxed. Still further, if the UE is configured with a DRX cycle, and if the UE enters a sleep duration of the DRX cycle after entering the relaxed mode, then a measurement periodicity of the UE may be extended in accordance with the DRX timer. Thus, the UE may continue to use a sub-optimal beam for a longer period of time, which degrades throughput and coverage of the UE. For example, with a DRX cycle of 320 ms, each beam measurement may take approximately 960 ms. Thus, if an Rx beam has several potential refined beams, then beam refinement may take several seconds.

Some techniques and apparatuses described herein provide beam management in connection with a tune-away, such as may be experienced by a multi-SIM UE. For example, some techniques and apparatuses described herein provide for beam measurement using a decreased measurement occasion periodicity (such as using all measurement occasions) if a tune-away prior to the beam measurement is longer than a threshold. Thus, the UE may more quickly refine a beam, which improves throughput and coverage of the UE and reduces pathloss. In some aspects, the UE may identify that a suitable beam has not been identified within a length of time (such as due to the UE using a DRX cycle after a tune-away), and the UE may use the decreased measurement occasion periodicity based at least in part on the suitable beam not being identified within the length of time. For example, the UE may puncture one or more measurement occasions (e.g., may increase measurement frequency) after the tune-away. Thus, the UE may more quickly identify a refined beam, which improves throughput and coverage of the UE and improves the coexistence of DRX cycles and tune-aways in multi-SIM UEs, thereby saving power.

Figure 7:
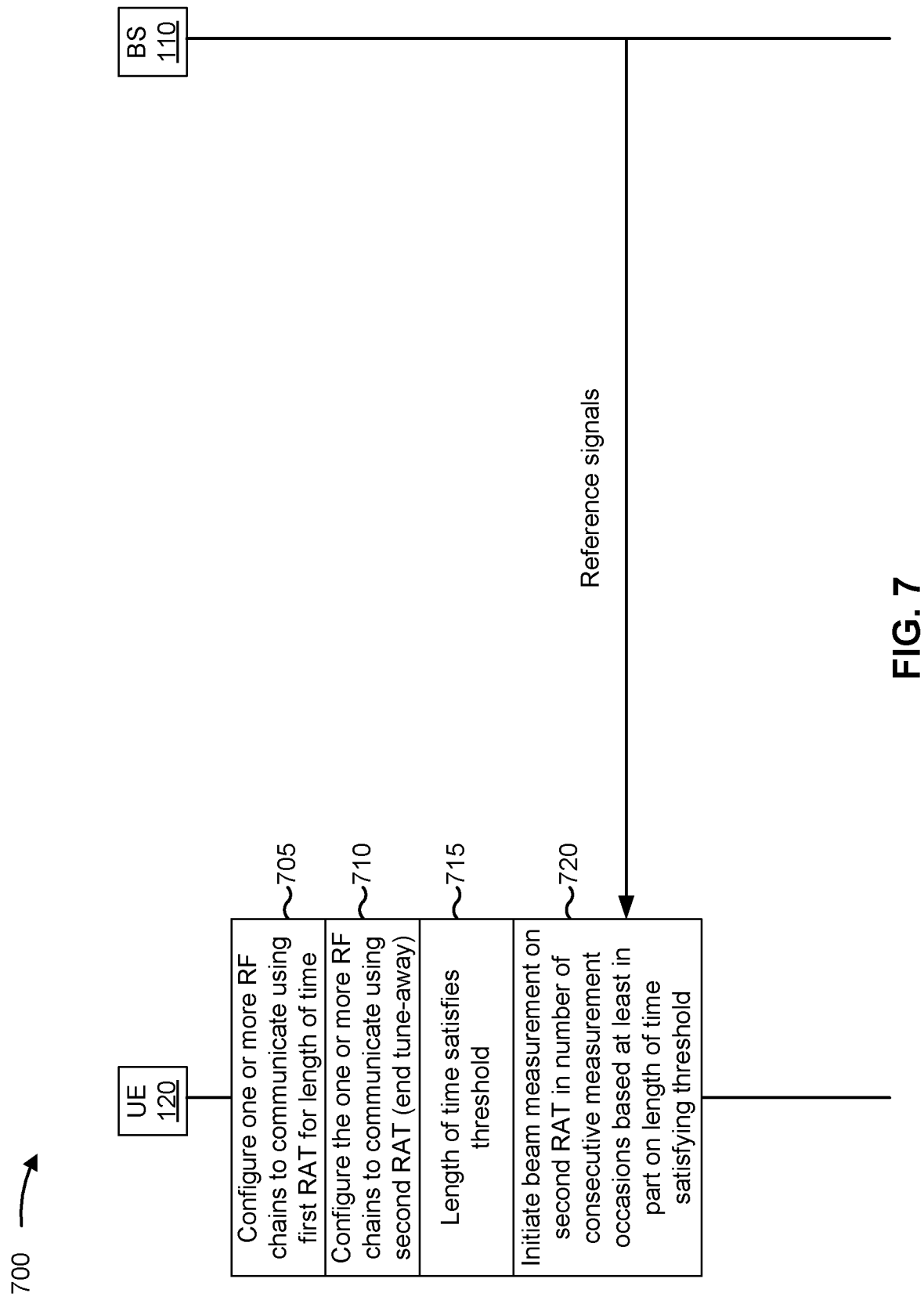
FIG. 7 is a diagram illustrating an example of beam refinement after a tune-away, in accordance with the present disclosure.

FIG. 7 is a diagram illustrating an example 700 of beam refinement after a tune-away, in accordance with the present disclosure. As shown, example 700 includes a UE 120 and a BS 110. In some aspects, the UE 120 may be a multi-SIM UE, as described in more detail in connection with FIG. 5.

As shown in FIG. 7, and by reference number 705, the UE 120 may configure one or more RF chains to communicate using a first RAT for a length of time. For example, the UE 120 may perform a tune-away from a second RAT to the first RAT. In some aspects, the first RAT may be an LTE RAT and the second RAT may be an NR RAT. In some aspects, the second RAT may be associated with beam management. For example, the second RAT may involve beamformed communication, such as in an mmW frequency range (e.g., FR2). In some aspects, the UE 120 may configure the one or more RF chains to communicate using the first RAT based at least in part on receiving paging on the first RAT. For example, a subscriber of the UE 120 associated with the first RAT may receive paging so the UE 120 may switch the one or more RF chains to be used by the subscriber associated with the paging rather than a subscriber associated with the second RAT.

In some aspects, the one or more RF chains may include all Tx and Rx chains of the UE 120 (such as on all active carriers of the UE), which is referred to herein as a full tune-away (FTA). In some aspects, the one or more RF chains may include a subset of Rx chains of the UE 120, which is referred to as a diversity tune-away (DTA). In some aspects, the one or more RF chains may include an RF chain that supports an anchor carrier of the UE 120 (which is used for beam management) on a given band.

The UE 120 may configure the one or more RF chains to communicate using the first RAT for a length of time. For example, the tune-away may last for the length of time. Thereafter, the UE 120 may configure the one or more RF chains to communicate using the second RAT, as shown by reference number 710. In some aspects, the UE 120 may suspend one or more timers during the tune-away. For example, the UE 120 may suspend one or more of a radio link monitoring (RLM) timer, a beam failure detection (BFD) timer, or a beam failure recovery (BFR) timer during the tune-away, which reduces interruption to communication of the UE 120.

As shown by reference number 715, the UE 120 may determine that the length of time (e.g., the length of the tune-away) satisfies a threshold. For example, the threshold may be configured by the BS 110, may be pre-configured for the UE 120, or the like. In some aspects, the UE 120 may determine that a beam used prior to the tune-away is no longer satisfactory. For example, the UE 120 may determine that a refined beam (e.g., a beam determined using P3 beam management) does not provide performance that satisfies a threshold (e.g., a measurement threshold, a throughput threshold, or the like). As just one example, the length of time may be 1.28 seconds.

As shown by reference number 720, the UE 120 may initiate a beam measurement on the second RAT in a number of consecutive measurement occasions based at least in part on the length of time satisfying the threshold. For example, the UE 120 may enter a mode in which the UE 120 performs beam measurements on all available measurement occasions. As another example, the UE 210 may perform a fast cell search. As still another example, the UE 120 may perform P3 beam measurement using a number of consecutive measurement occasions. Thus, the UE 120 may reduce the length of time that elapses before the UE 120 can refine a beam after a tune-away, which increases throughput, reduces pathloss, and reduces interruption to user experience.

In some aspects, the UE 120 may reset one or more timers (such as an RLM timer, a BFD timer, or a BFR timer) after configuring the one or more RF chains to return to the second RAT. Thus, the UE 120 may avoid declaring beam failure or radio link failure immediately after returning to the second RAT. In some aspects, the UE 120 may drop beam information from a measurement database. For example, the UE 120 may drop information indicating past beam measurements, which conserves storage resources of the UE 120 and which improves the efficiency of beam refinement on the assumption that the beam information may be stale after the tune-away. In some aspects, the UE 120 may preserve (e.g., not drop) beam information pertaining to a serving beam of the UE 120. Thus, the UE 120 can perform beam refinement of the serving beam using the beam information pertaining to the serving beam if the serving beam is still suitable (but potentially in need of refinement).

In some aspects, after configuring the one or more RF chains to communicate using the second RAT, the UE 120 may use a serving beam from prior to the tune-away to communicate using the second RAT. For example, in some cases, the serving beam may be suitable for communication but may benefit from refinement. In this scenario, the UE 120 may continue loop tracking (such as for a time tracking loop, a frequency tracking loop, or automatic gain control) using the serving beam. Additionally, or alternatively, the UE 120 may continue downlink or uplink data communication using the serving beam. The UE 120 may also perform beam refinement for the serving beam using the number of consecutive measurement occasions.

In some aspects, the UE 120 may perform the beam measurement based at least in part on information regarding an orientation of the UE 120, a displacement of the UE 120, a velocity of the UE 120, an acceleration of the UE 120, a trajectory of the UE 120, or the like. For example, the UE 120 may perform the beam measurement based at least in part on orientation information, displacement information, trajectory information, or sensor information associated with the UE 120. The UE 120 may obtain such information from a magnetometer of the UE 120, a gyroscope of the UE 120, an accelerometer of the UE 120, or another sensor of the UE 120. In some aspects, if the UE 120 is stationary, the UE 120 may modify the length of time (e.g., may lengthen the length of time) so that the UE 120 can use the beam information of the measurement database for a longer length of time.

In some aspects, the UE 120 may determine a beam based at least in part on information regarding an orientation of the UE 120, a displacement of the UE 120, a velocity of the UE 120, an acceleration of the UE 120, a trajectory of the UE 120, or the like. For example, the UE 120 may use this information to identify a beam that is expected to provide service that satisfies a threshold, and the UE 120 may perform loop tracking or downlink or uplink data communication using the beam. In some aspects, the UE 120 may concurrently perform beam measurement (e.g., beam refinement) while using the beam. In some other aspects, the UE 120 may not perform beam measurement (e.g., beam refinement) based at least in part on identifying the beam, thereby conserving resources that would otherwise be used for the beam measurement.

As indicated above, FIG. 7 is provided as an example. Other examples may differ from what is described with regard to FIG. 7.

Figure 8:
FIG. 8 is a diagram illustrating an example of beam refinement after a tune-away based at least in part on a DRX cycle, in accordance with the present disclosure.

FIG. 8 is a diagram illustrating an example 800 of beam refinement after a tune-away based at least in part on a DRX cycle, in accordance with the present disclosure. As shown, example 800 includes a UE 120 and a BS 110. In some aspects, the UE 120 may be a multi-SIM UE, as described in more detail in connection with FIG. 5. In example 800, the UE 120 is configured with a DRX cycle. Example 800 pertains to a first RAT and a second RAT. In example 800, the first RAT is an LTE RAT, and the second RAT is an NR RAT, though the techniques described in example 800 can be applied for other combinations of RATs.

As shown in FIG. 8, and by reference number 805, the UE 120 may have an ongoing data communication on the NR RAT. For example, the ongoing data communication may be associated with a first subscriber of the UE 120. In some aspects, the UE 120 may have or establish an active carrier associated with the NR RAT. Furthermore, the UE 120 may use a refined beam for the ongoing data communication. In some aspects, a refined beam is a beam determined using beam refinement, such as a P3 beam refinement procedure. In some aspects, a refined beam is a beam associated with a threshold level of refinement. For example, the UE 120 may use beams having various levels of refinement (such as a PO level of refinement, a Level 1 (L1) level of refinement, a Level 2 (L2) level of refinement, and a Level 3 (L3) level of refinement). In this example, a refined beam may be an L3 beam. In some aspects, a refined beam is a beam having smaller than a threshold beam width.

As shown by reference number 810, the UE 120 may receive paging on an LTE RAT. For example, the UE 120 may receive a paging message associated with a carrier associated with the LTE RAT. In some aspects, the LTE RAT may be associated with a second subscriber of the UE 120.

As shown by reference number 815, the UE 120 may configure one or more RF chains for communication using the LTE RAT. For example, the UE 120 may perform a tune-away to the LTE RAT with regard to the one or more RF chains. The tune-away is described in more detail in connection with reference numbers 705 and 710 of FIG. 7. In some aspects, the UE 120 may configure the one or more RF chains for communication using the LTE RAT based at least in part on a channel maintenance configuration.

As shown by reference number 820, the UE 120 may return (e.g., configure) the one or more RF chains to communication using the NR RAT after a length of time. For example, the UE 120 may tune the one or more RF chains back to the NR RAT after the length of time. In some aspects, the UE 120 may determine that the length of time satisfies a threshold, as described in more detail in connection with reference number 715 of FIG. 7. In some aspects, the length of time may be pre-configured for the UE 120. In some aspects, the length of time may be configured by the BS 110. As just one example, the length of time may be approximately 1.28 seconds. In some aspects, the UE 120 may use an unrefined beam (such as a PO beam or a beam with lower than a threshold level of refinement) after returning to the NR RAT. For example, the UE 120 may use the unrefined beam based at least in part on the length of time satisfying the threshold.

As shown by reference number 825, the UE 120 may determine that a DRX sleep state is started within a threshold length of time after an end of the tune-away described in connection with reference numbers 815 and 820. For example, if the DRX sleep state starts within the threshold length of time, then the UE 120 may not have time to perform an adequate number of beam measurements to facilitate beam refinement after the tune-away. Furthermore, in the DRX sleep state, the UE 120 may perform beam refinement using a longer measurement occasion periodicity (e.g., 960 ms in one example), which further delays beam refinement after the tune-away.

As shown by reference number 830, the UE 120 may determine that a beam measurement satisfies a measurement threshold. For example, the UE 120 may determine that a measurement using a beam after the tune-away (e.g., a signal to noise ratio (SNR)) satisfies a measurement threshold. If the beam's measurement was lower than the measurement threshold, then the UE 120 might trigger beam management using a shorter measurement occasion periodicity (which may be referred to as "beam panic" or "cell panic"). In this example, the beam may be an unrefined beam, such as a PO beam or a beam with lower than a threshold level of refinement. If the unrefined beam satisfies the measurement threshold, the UE 120 may not trigger a shorter measurement occasion periodicity (which may be referred to as "cell excellent mode"). However, in this scenario, the UE 120 continues to use the unrefined beam, which decreases throughput and increases pathloss. Furthermore, since the UE 120 is in the DRX sleep state, measurements of the UE 120 may be further delayed, thereby decreasing throughput and increasing pathloss.

As shown by reference number 835, the UE 120 may shorten a measurement occasion periodicity based at least in part on the measurement satisfying the measurement threshold, the DRX sleep state having started within the threshold length of time, and the length of the tune-away satisfying the threshold. For example, the UE 120 may initiate a beam measurement on the second RAT using a number of consecutive measurement occasions (e.g., two or more consecutive measurement occasions) based at least in part on the measurement satisfying the measurement threshold, the DRX sleep state having started within the threshold length of time, and the length of the tune-away satisfying the threshold. Thus, in a scenario where an unrefined beam of the UE 120 satisfies a measurement threshold after a tune-away of a threshold length, and where the UE 120 has entered a DRX sleep state before beam refinement can be performed, the UE 120 can accelerate beam measurement so that beam refinement can be performed more quickly after a tune-away, which increases throughput and reduces pathloss.

In some aspects, the UE 120 may perform the beam measurement in fewer than all measurement occasions in a given window. For example, the UE 120 may perform the beam measurement using a modified measurement occasion periodicity relative to a baseline measurement occasion periodicity (e.g., the modified measurement occasion periodicity may be 0.5*x, where x is the baseline measurement occasion periodicity).

In some aspects, the number of consecutive measurement occasions may be within a time window. For example, the UE 120 may perform a beam measurement in each measurement occasion within the time window. In some aspects, the time window may be pre-configured for the UE 120. In some aspects, the time window may be configured by the BS 110. In some aspects, the time window may be based at least in part on a measurement. For example, the UE 120 may determine an end of the time window once the UE 120 has identified a refined beam, or once a metric associated with the refined beam satisfies a threshold. By using the time window, power consumption is reduced.

In this way, the UE 120 may reduce the length of time spent using an unrefined beam after a tune-away of a threshold length. For example, the UE 120 may accelerate beam measurement by using a shorter measurement occasion periodicity and/or a number of consecutive measurement occasions if a tune-away is of a threshold length and/or if the UE 120 has entered a DRX sleep state within a threshold length of time after the tune-away. By using the shorter measurement occasion periodicity and/or the number of consecutive measurement occasions, the length of time spent using an unrefined beam (e.g., a PO beam) after a tune-away is reduced, which improves throughput and reduces pathloss. Thus, communication performance of UEs that perform tune-aways, such as multi-SIM UEs, is improved.

As indicated above, FIG. 8 is provided as an example. Other examples may differ from what is described with regard to FIG. 8.

Figure 9:
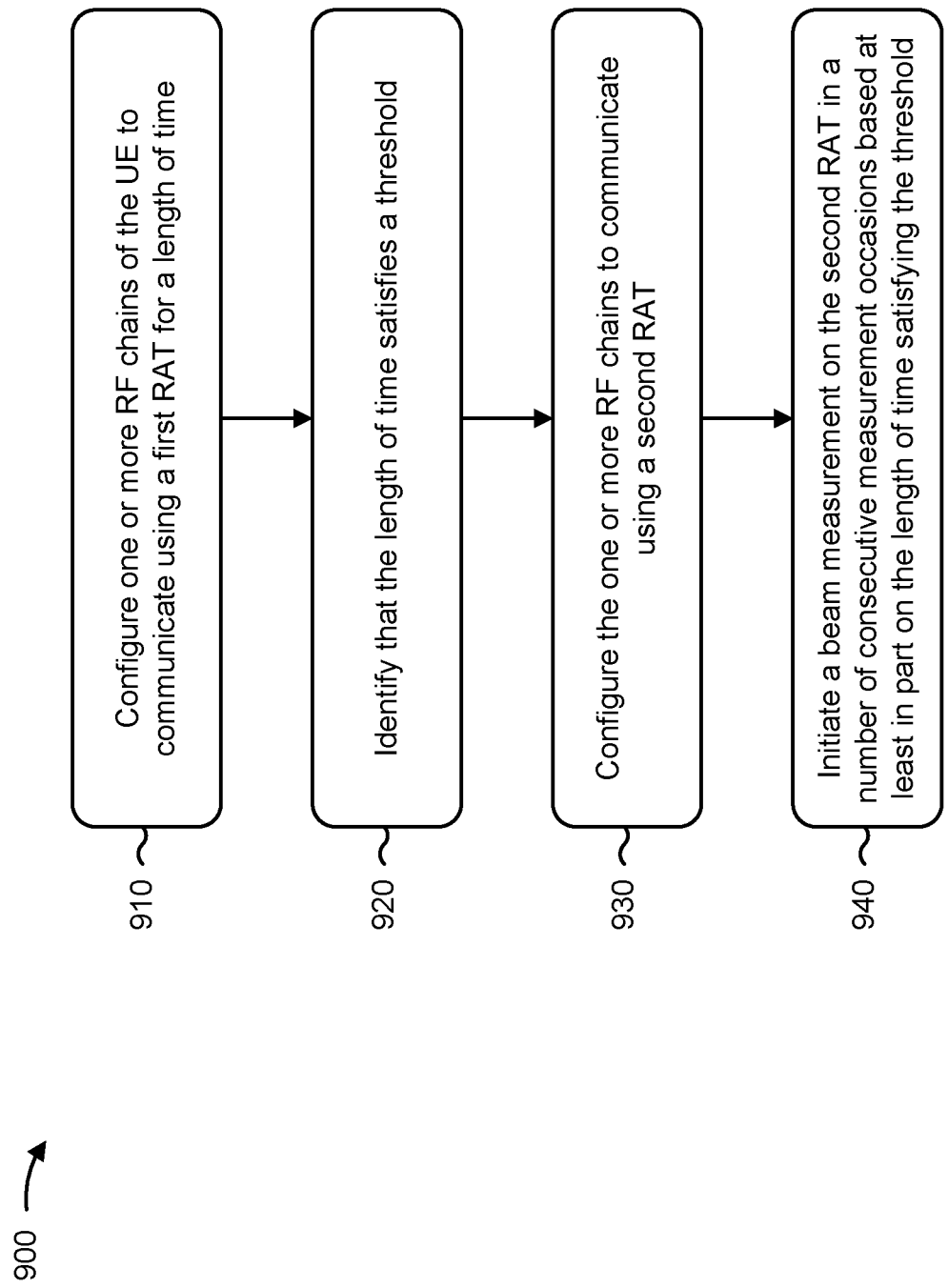
FIG. 9 is a diagram illustrating an example process performed, for example, by a UE, in accordance with the present disclosure.

FIG. 9 is a diagram illustrating an example process 900 performed, for example, by a UE, in accordance with the present disclosure. Example process 900 is an example where the UE (e.g., UE 120, an apparatus of a UE) performs operations associated with techniques for beam management during a tune-away.

As shown in FIG. 9, in some aspects, process 900 may include configuring one or more RF chains of the UE to communicate using a first RAT for a length of time (block 910). For example, the UE (e.g., using communication manager 140 and/or reception component 1002, depicted in FIG. 10) may configure one or more RF chains of the UE to communicate using a first RAT for a length of time, as described above.

As further shown in FIG. 9, in some aspects, process 900 may include identifying that the length of time satisfies a threshold (block 920). For example, the UE (e.g., using communication manager 140 and/or identification component 1008, depicted in FIG. 10) may identify that the length of time satisfies a threshold, as described above.

As further shown in FIG. 9, in some aspects, process 900 may include configuring the one or more RF chains to communicate using a second RAT (block 930). For example, the UE (e.g., using communication manager 140 and/or reception component 1002, depicted in FIG. 10) may configure the one or more RF chains to communicate using a second RAT, as described above.

As further shown in FIG. 9, in some aspects, process 900 may include initiating a beam measurement on the second RAT in a number of consecutive measurement occasions based at least in part on the length of time satisfying the threshold (block 940). For example, the UE (e.g., using communication manager 140 and/or measurement component 1010, depicted in FIG. 10) may initiate a beam measurement on the second RAT in a number of consecutive measurement occasions based at least in part on the length of time satisfying the threshold, as described above.

Process 900 may include additional aspects, such as any single aspect or any combination of aspects described below and/or in connection with one or more other processes described elsewhere herein.

In a first aspect, process 900 includes resetting a timer associated with radio link monitoring, beam failure detection, or beam failure recovery based at least in part on the length of time satisfying the threshold.

In a second aspect, alone or in combination with the first aspect, process 900 includes dropping beam information from a measurement database based at least in part on the length of time satisfying the threshold.

In a third aspect, alone or in combination with one or more of the first and second aspects, process 900 includes performing loop tracking or data communication using a serving beam from prior to tuning the one or more RF chains to the first RAT.

In a fourth aspect, alone or in combination with one or more of the first through third aspects, the beam measurement is associated with a cell panic mode.

In a fifth aspect, alone or in combination with one or more of the first through fourth aspects, the one or more RF chains include all transmit chains and all receive chains of the UE.

In a sixth aspect, alone or in combination with one or more of the first through fifth aspects, the one or more RF chains include one or more receive chains of the UE.

In a seventh aspect, alone or in combination with one or more of the first through sixth aspects, the one or more RF chains are associated with an anchor carrier of the UE.

In an eighth aspect, alone or in combination with one or more of the first through seventh aspects, configuring the one or more RF chains to communicate using the first RAT is associated with a multiple subscriber configuration of the UE.

In a ninth aspect, alone or in combination with one or more of the first through eighth aspects, the beam measurement is based at least in part on at least one of orientation information, displacement information, trajectory information, or sensor information associated with the UE.

In a tenth aspect, alone or in combination with one or more of the first through ninth aspects, the beam measurement or the threshold for the length of time are based at least in part on the UE being stationary.

In an eleventh aspect, alone or in combination with one or more of the first through tenth aspects, the beam measurement is based at least in part on the UE using an initial beam on the second RAT for a threshold amount of time.

In a twelfth aspect, alone or in combination with one or more of the first through eleventh aspects, the beam measurement is based at least in part on the UE being in a connected mode discontinuous reception cycle on the second RAT.

In a thirteenth aspect, alone or in combination with one or more of the first through twelfth aspects, the beam measurement on the number of consecutive measurement occasions is used until a beam of a threshold refinement is identified.

In a fourteenth aspect, alone or in combination with one or more of the first through thirteenth aspects, the number of consecutive measurement occasions is based at least in part on a configured length of time.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
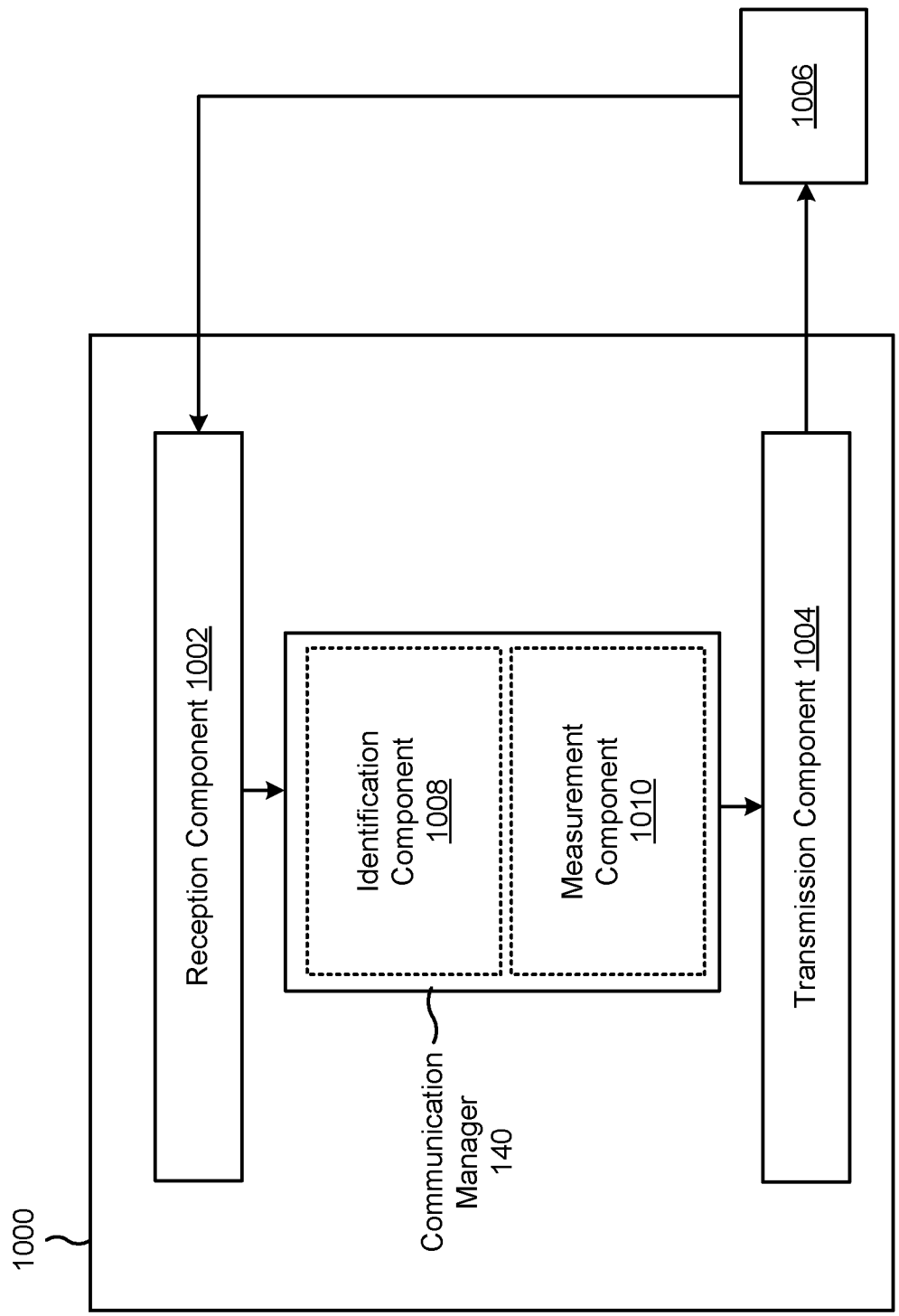
FIG. 10 is a diagram of an example apparatus for wireless communication, in accordance with the present disclosure.

FIG. 10 is a diagram of an example apparatus 1000 for wireless communication, in accordance with the present disclosure. The apparatus 1000 may be a UE, or a UE may include the apparatus 1000. In some aspects, the apparatus 1000 includes a reception component 1002 and a transmission component 1004, which may be in communication with one another (for example, via one or more buses and/or one or more other components). As shown, the apparatus 1000 may communicate with another apparatus 1006 (such as a UE, a base station, or another wireless communication device) using the reception component 1002 and the transmission component 1004. As further shown, the apparatus 1000 may include the communication manager 140. The communication manager 140 may include one or more of an identification component 1008 or a measurement component 1010, among other examples.

In some aspects, the apparatus 1000 may be configured to perform one or more operations described herein in connection with FIGS. 3-8. Additionally, or alternatively, the apparatus 1000 may be configured to perform one or more processes described herein, such as process 900 of FIG. 9 or a combination thereof. In some aspects, the apparatus 1000 and/or one or more components shown in FIG. 10 may include one or more components of the UE described in connection with FIG. 2. Additionally, or alternatively, one or more components shown in FIG. 10 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1006. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1000. In some aspects, the reception component 1002 may include one or more antennas, a modem, a demodulator, a MIMO detector, a receive processor, a controller/processor, a memory, or a combination thereof, of the UE described in connection with FIG. 2.

The transmission component 1004 may transmit communications, such as reference signals, control information, data communications, or a combination thereof, to the apparatus 1006. In some aspects, one or more other components of the apparatus 1000 may generate communications and may provide the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modem, a modulator, a transmit MIMO processor, a transmit processor, a controller/processor, a memory, or a combination thereof, of the UE described in connection with FIG. 2. In some aspects, the transmission component 1004 may be co-located with the reception component 1002 in a transceiver.

The reception component 1002 may configure one or more RF chains of the UE to communicate using a first RAT for a length of time. The identification component 1008 may identify that the length of time satisfies a threshold. The reception component 1002 may configure the one or more RF chains to communicate using a second RAT. The measurement component 1010 may initiate a beam measurement on the second RAT in a number of consecutive measurement occasions based at least in part on the length of time satisfying the threshold.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

The following provides an overview of some Aspects of the present disclosure:

Aspect 1: A method of wireless communication performed by a user equipment (UE), comprising: configuring one or more radio frequency (RF) chains of the UE to communicate using a first radio access technology (RAT) for a length of time; identifying that the length of time satisfies a threshold; configuring the one or more RF chains to communicate using a second RAT; and initiating a beam measurement on the second RAT in a number of consecutive measurement occasions based at least in part on the length of time satisfying the threshold.

Aspect 2: The method of Aspect 1, further comprising: resetting a timer associated with radio link monitoring, beam failure detection, or beam failure recovery based at least in part on the length of time satisfying the threshold.

Aspect 3: The method of any of Aspects 1-2, further comprising: dropping beam information from a measurement database based at least in part on the length of time satisfying the threshold.

Aspect 4: The method of any of Aspects 1-3, further comprising: performing loop tracking or data communication using a serving beam from prior to tuning the one or more RF chains to the first RAT.

Aspect 5: The method of any of Aspects 1-4, wherein the beam measurement is associated with a cell panic mode.

Aspect 6: The method of any of Aspects 1-5, wherein the one or more RF chains include all transmit chains and all receive chains of the UE.

Aspect 7: The method of any of Aspects 1-6, wherein the one or more RF chains include one or more receive chains of the UE.

Aspect 8: The method of any of Aspects 1-7, wherein the one or more RF chains are associated with an anchor carrier of the UE.

Aspect 9: The method of any of Aspects 1-8, wherein configuring the one or more RF chains to communicate using the first RAT is associated with a multiple subscriber configuration of the UE.

Aspect 10: The method of any of Aspects 1-9, wherein the beam measurement is based at least in part on at least one of orientation information, displacement information, trajectory information, or sensor information associated with the UE.

Aspect 11: The method of any of Aspects 1-10, wherein the beam measurement or the threshold for the length of time are based at least in part on the UE being stationary.

Aspect 12: The method of any of Aspects 1-11, wherein the beam measurement is based at least in part on the UE using an initial beam on the second RAT for a threshold amount of time.

Aspect 13: The method of any of Aspects 1-12, wherein the beam measurement is based at least in part on the UE being in a connected mode discontinuous reception cycle on the second RAT.

Aspect 14: The method of any of Aspects 1-13, wherein the beam measurement on the number of consecutive measurement occasions is used until a beam of a threshold refinement is identified.

Aspect 15: The method of any of Aspects 1-14, wherein the number of consecutive measurement occasions is based at least in part on a configured length of time.

Aspect 16: An apparatus for wireless communication at a device, comprising a processor; memory coupled with the processor; and instructions stored in the memory and executable by the processor to cause the apparatus to perform the method of one or more of Aspects 1-15.

Aspect 17: A device for wireless communication, comprising a memory and one or more processors coupled to the memory, the one or more processors configured to perform the method of one or more of Aspects 1-15.

Aspect 18: An apparatus for wireless communication, comprising at least one means for performing the method of one or more of Aspects 1-15.

Aspect 19: A non-transitory computer-readable medium storing code for wireless communication, the code comprising instructions executable by a processor to perform the method of one or more of Aspects 1-15.

Aspect 20: A non-transitory computer-readable medium storing a set of instructions for wireless communication, the set of instructions comprising one or more instructions that, when executed by one or more processors of a device, cause the device to perform the method of one or more of Aspects 1-15.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a user equipment (UE), comprising:
    configuring one or more radio frequency (RF) chains of the UE to communicate using a first radio access technology (RAT) for a length of time;
    identifying that the length of time satisfies a threshold;
    configuring the one or more RF chains to communicate using a second RAT; and
    initiating a beam measurement on the second RAT in a number of consecutive measurement occasions based at least in part on the length of time satisfying the threshold.

2. The method of claim 1, further comprising:
    resetting a timer associated with radio link monitoring, beam failure detection, or beam failure recovery based at least in part on the length of time satisfying the threshold.

3. The method of claim 1, further comprising:
dropping beam information from a measurement database based at least in part on the length of time satisfying the threshold.

4. The method of claim 1, further comprising:
performing loop tracking or data communication using a serving beam from prior to tuning the one or more RF chains to the first RAT.

5. The method of claim 1, wherein the beam measurement is associated with a cell panic mode.

6. The method of claim 1, wherein the one or more RF chains include all transmit chains and all receive chains of the UE.

7. The method of claim 1, wherein the one or more RF chains include one or more receive chains of the UE.

8. The method of claim 1, wherein the one or more RF chains are associated with an anchor carrier of the UE.

9. The method of claim 1, wherein configuring the one or more RF chains to communicate using the first RAT is associated with a multiple subscriber configuration of the UE.

10. The method of claim 1, wherein the beam measurement is based at least in part on at least one of orientation information, displacement information, trajectory information, or sensor information associated with the UE.

11. The method of claim 1, wherein the beam measurement or the threshold for the length of time are based at least in part on the UE being stationary.

12. The method of claim 1, wherein the beam measurement is based at least in part on the UE using an initial beam on the second RAT for a threshold amount of time.

13. The method of claim 1, wherein the beam measurement is based at least in part on the UE being in a connected mode discontinuous reception cycle on the second RAT.

14. The method of claim 1, wherein the beam measurement on the number of consecutive measurement occasions is used until a beam of a threshold refinement is identified.

15. The method of claim 1, wherein the number of consecutive measurement occasions is based at least in part on a configured length of time.

16. A user equipment (UE) for wireless communication, comprising:
one or more memories; and
one or more processors, coupled to the one or more memories, configured to:
configure one or more radio frequency (RF) chains of the UE to communicate using a first radio access technology (RAT) for a length of time;
identify that the length of time satisfies a threshold;
configure the one or more RF chains to communicate using a second RAT; and
initiate a beam measurement on the second RAT in a number of consecutive measurement occasions based at least in part on the length of time satisfying the threshold.

17. The UE of claim 16, wherein the one or more processors are further configured to:
reset a timer associated with radio link monitoring, beam failure detection, or beam failure recovery based at least in part on the length of time satisfying the threshold.

18. The UE of claim 16, wherein the one or more processors are further configured to:
drop beam information from a measurement database based at least in part on the length of time satisfying the threshold.

19. The UE of claim 16, wherein the one or more processors are further configured to:
perform loop tracking or data communication using a serving beam from prior to tuning the one or more RF chains to the first RAT.

20. The UE of claim 16, wherein the beam measurement is associated with a cell panic mode.

21. The UE of claim 16, wherein the one or more RF chains include all transmit chains and all receive chains of the UE.

22. The UE of claim 16, wherein the one or more RF chains include one or more receive chains of the UE.

23. The UE of claim 16, wherein the one or more RF chains are associated with an anchor carrier of the UE.

24. A non-transitory computer-readable medium storing a set of instructions for wireless communication, the set of instructions comprising:
one or more instructions that, when executed by one or more processors of a user equipment (UE), cause the UE to:
configure one or more radio frequency (RF) chains of the UE to communicate using a first radio access technology (RAT) for a length of time;
identify that the length of time satisfies a threshold;
configure the one or more RF chains to communicate using a second RAT; and
initiate a beam measurement on the second RAT in a number of consecutive measurement occasions based at least in part on the length of time satisfying the threshold.

25. The non-transitory computer-readable medium of claim 24, wherein the one or more instructions further cause the UE to:
reset a timer associated with radio link monitoring, beam failure detection, or beam failure recovery based at least in part on the length of time satisfying the threshold.

26. The non-transitory computer-readable medium of claim 24, wherein the one or more instructions further cause the UE to:
drop beam information from a measurement database based at least in part on the length of time satisfying the threshold.

27. The non-transitory computer-readable medium of claim 24, wherein the one or more instructions further cause the UE to:
perform loop tracking or data communication using a serving beam from prior to tuning the one or more RF chains to the first RAT.

28. An apparatus for wireless communication, comprising:
means for configuring one or more radio frequency (RF) chains of the apparatus to communicate using a first radio access technology (RAT) for a length of time;
means for identifying that the length of time satisfies a threshold;
means for configuring the one or more RF chains to communicate using a second RAT; and
means for initiating a beam measurement on the second RAT in a number of consecutive measurement occasions based at least in part on the length of time satisfying the threshold.

29. The apparatus of claim 28, further comprising:
means for resetting a timer associated with radio link monitoring, beam failure detection, or beam failure recovery based at least in part on the length of time satisfying the threshold.

30. The apparatus of claim 28, further comprising:
  means for dropping beam information from a measurement database based at least in part on the length of time satisfying the threshold.

* * * * *